United States Patent [19]

Dolata et al.

[11] Patent Number: 4,644,658
[45] Date of Patent: Feb. 24, 1987

[54] LUBRICATING-OIL PUMP ARRANGEMENT FOR A MOTOR-DRIVEN APPARATUS

[75] Inventors: Hans Dolata, Waiblingen; Reinhold Fink, Fellbach; Gerd Itzrodt, Waiblingen; Adam Kelbert, Remshalden; Siegfried Ryssel, Kirchberg/Murr; Anton Wehle, Fellbach; Dieter Wieland, Remseck; Gerhard Zerrer, Korb, all of Fed. Rep. of Germany

[73] Assignee: Andreas Stihl, Waiblingen, Fed. Rep. of Germany

[21] Appl. No.: 680,397

[22] Filed: Dec. 11, 1984

[30] Foreign Application Priority Data

Dec. 14, 1983 [DE] Fed. Rep. of Germany ....... 3345121

[51] Int. Cl.[4] .................. B23D 57/02; F01M 1/00
[52] U.S. Cl. ................... 30/381; 83/169; 184/11.5
[58] Field of Search ................. 30/381–387, 30/123.4; 83/169; 184/11.5

[56] References Cited

U.S. PATENT DOCUMENTS

| | | | |
|---|---|---|---|
| 2,755,826 | 7/1956 | Kiekhaefer | 83/169 |
| 3,763,962 | 10/1973 | Gottlieb | 83/169 X |
| 3,865,213 | 2/1975 | McDermott | 83/169 X |

FOREIGN PATENT DOCUMENTS

| | | | |
|---|---|---|---|
| 628707 | 10/1961 | Canada | 30/123.4 |
| 2505719 | 11/1982 | France | 30/123.4 |

Primary Examiner—E. R. Kazenske
Assistant Examiner—Willmon Fridie, Jr.
Attorney, Agent, or Firm—Walter Ottesen

[57] ABSTRACT

The invention is directed to a motor-driven apparatus such as a motor-driven chain saw or the like. It includes a lubricating-oil pump and an oil supply for a work tool and is equipped with a device for interrupting the supply of oil to the tool. This facilitates use of the chain saw apparatus with an accessory attachment work tool such as a hedge trimmer, drilling tool or the like for which a flow of lubricating oil is unnecessary.

17 Claims, 9 Drawing Figures

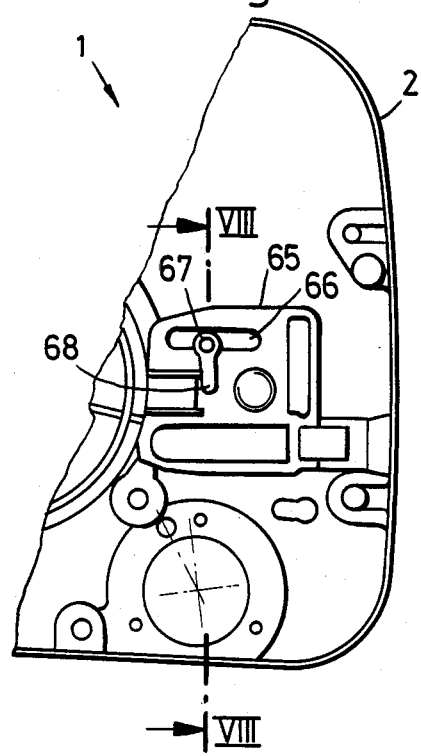
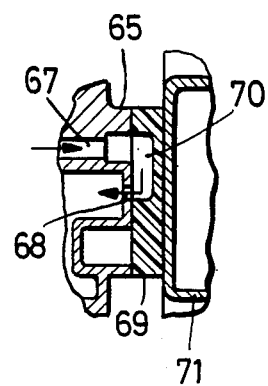
Fig. 7
Fig. 8

LUBRICATING-OIL PUMP ARRANGEMENT FOR A MOTOR-DRIVEN APPARATUS

FIELD OF THE INVENTION

The invention relates to a lubricating-oil pump arrangement for a motor-driven apparatus having a work tool driven by the motor thereof. The apparatus is equipped with a lubricating-oil pump and a conduit for guiding the oil to the work tool of the apparatus.

BACKGROUND OF THE INVENTION

Motor-driven devices of this type which are configured as motor-driven chain saws have a guide bar for guiding the movement of a saw chain thereon. It is known to equip such motor-driven chain saws also with other tools such as a hedge trimmer, a drilling tool, or the like. Conventional motor-driven chain saws have as standard equipment a lubricating-oil pump feeding lubricating oil from an oil tank to the moving saw chain. When resharpening saw chains and especially back-edge sharpened saw chains, an automatic sharpener is mounted onto the motor-driven chain saw and contamination of the sharpener by leaking lubricating oil must be avoided. Oil lubrication may be unnecessary for another attachment such as a hedge trimmer. The other attachment is fitted to the known motor-driven chain saw by first removing the guide bar, the saw chain and the sprocket cover, and then mounting the driving apparatus for the hedge trimmer or a drilling attachment.

To avoid unnecessary loss of lubricating oil, it has been customary to drain the oil tank prior to mounting and connecting the relevant attachment. Previously, this was accomplished by bringing the motor-driven chain saw into a suitable position for draining, collecting the lubricating oil in a container and then filling it back into the oil tank of the motor-driven saw following refitting of the latter for chain saw operation.

Draining of the oil tank is time-consuming, requires a special container for holding the oil and may result in the loss of oil and, if not properly handled, also may result in contamination of the lubricating oil which is to be filled back into the oil tank after the motor-driven chain saw is refitted to normal chain saw operation.

SUMMARY OF THE INVENTION

It is an object of the invention to eliminate these shortcomings and to improve upon a motor-driven apparatus such that special handling involving the decanting of oil is avoided.

It is a further object of the invention to provide a lubricating pump arrangement for a motor-driven apparatus such as a chain saw or the like to supply lubricating oil to a work tool. The lubricating arrangement includes a tank for holding a supply of lubricating oil; pump means for pumping the lubricating oil from the tank to the work tool; and, interrupt means for interrupting the flow of lubricating oil to the work tool.

Preferred embodiments and improvements as well as further advantages and essential details of the invention will become apparent from the following description and the drawing showing preferred embodiments thereof.

BRIEF DESCRIPTION OF THE DRAWING

The invention will now be described with reference to the drawing wherein:

FIG. 7 is a fragmentary side elevation view of the motor-driven chain saw similar to FIGS. 1 and 5 showing the region whereat the guide bar is attached to the housing; and, FIG 8 is a break-out view, in section, taken along line VIII—VIII of the motor-driven chain saw of FIG. 7.

DESCRIPTION OF THE PREFERRED EMBODIMENTS OF THE INVENTION

Figure 1:
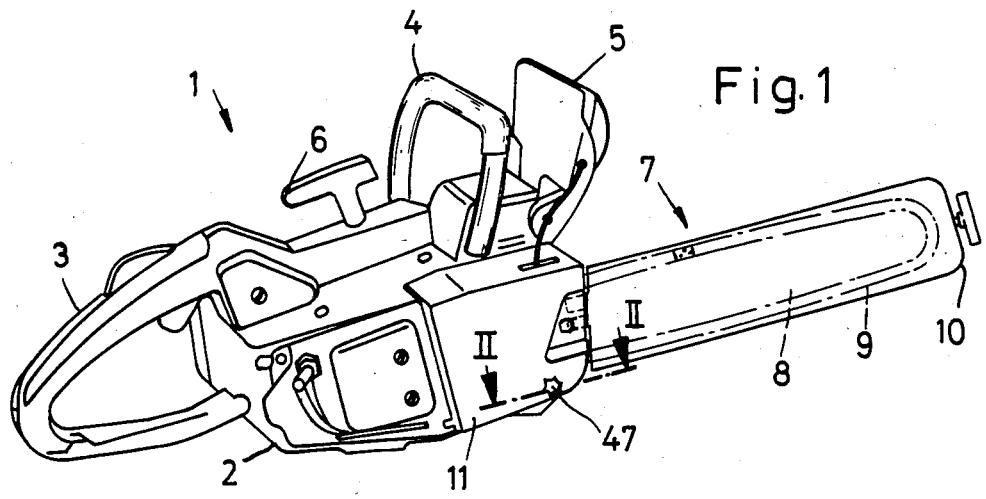
FIG. 1 is a perspective view of a motor-driven chain saw equipped with a lubricating-oil pump arrangement according to the invention.

The motor-driven apparatus of the invention illustrated in the drawing is in the form of a motor-driven chain saw 1 and includes a drive motor (not shown) mounted in a housing 2 which is provided with a rearward guide handle 3, a forward carrying handle 4 and a guard 5. On top of housing 2, a pull starter 6 for starting the drive motor is provided between guiding handle 3 and carrying handle 4. In addition, motor-driven chain saw 1 includes a forwardly extending guide bar assembly 7 having a guide bar 8 on which a saw chain 9 is guided in its movement therearound and a sharpener 10 for the saw chain 9. The sharpener 10 is slid over the guide bar 8 as shown in FIG. 1. Guide bar 8 is removably fastened to housing 2 in the drive area of saw chain 9 preferably by means of a threaded fastener connection and covered by a sprocket cover 11 forming part of housing 2.

Motor-driven chain saw 1 is equipped with a lubricating-oil pump 12 which, in the embodiments illustrated in FIGS. 1 to 4, is configured as a diaphragm pump for feeding the lubricating oil to saw chain 9 from an oil tank 13.

Lubricating-oil pump 12 includes a housing 14 having a shoulder 15 resting flush on a corresponding projection 16 of crankcase 17 with a sealing washer 18 disposed therebetween. Crankcase 17 which surrounds lubricating-oil pump 12 also accommodates the lubricating oil therein. Thus, crankcase 17 is at the same time the oil tank 13 and the lubricating-oil pump 12 is housed in oil tank 13. More specifically, the lubricating-oil pump 12 is surrounded by the lubricating oil because it is disposed in the lubricating-oil tank.

A cover 19 is on housing 14 and a pump diaphragm 20 defines one of the boundaries of a chamber 21 in the cover 19. The diaphragm 20 is firmly clamped between cover 19 and housing 14. Chamber 21 is connected with the crankcase pump so that the overpressure and underpressure generated by the crankcase pump is directly transmitted to chamber 21. This overpressure or underpressure acts upon pump diaphragm 20 such that in the presence of an underpressure the diaphragm will perform a stroke movement in the direction toward cover 19 in opposition to the force of a helical compression spring 22.

Pump diaphragm 20 is clamped between an upper disc 23 and a lower disc 24 which are connected with a piston rod 25 by means of a rivet connection, for example. Helical compression spring 22 bears with one end against upper disc 23 and, with its other end, against inner wall surface 26 (FIG. 3) of cover 19.

Figure 3:
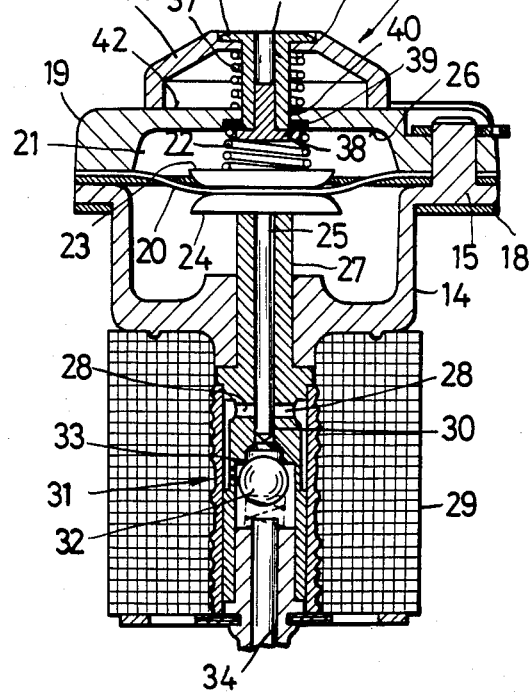
FIG. 3 is a section view of the lubricating-oil pump of the motor-driven chain saw of FIGS. 1 and 2.

Referring to FIG. 3, piston rod 25, upper disc 23, lower disc 24 and pump diaphragm 20 inserted therebetween are connected together to form a component unit. Accordingly, the stroke movement of pump diaphragm 20 occurring in the presence of an underpressure in chamber 21 also causes piston rod 25 to move upwardly from the position shown in FIG. 3 in the direction of cover 19, whereby piston rod 25, which is guided in a pump cylinder 27, overtravels with its lower end a suction bore means configured as transverse bores 28 in pump cylinder 27. With this lifting stroke of piston rod 25, an underpressure results producing a suction effect which enables the lubricating oil to flow from oil tank 13 to suction bores 28 via an oil suction filter 29 surrounding the latter. Thus, the lubricating oil reaches the vertical cylinder bore 30 of pump cylinder 27. The subsequent overpressure wave from the crankcase pump is likewise directed into chamber 21; this overpressure then pushes piston rod 25 downwards, assisted, if necessary, by helical compression spring 22, thereby urging the lubricating oil held in cylinder bore 30 in the direction of discharge valve 31 of pump cylinder 27, the valve 31 being configured as a pressure-relief valve. As a result, spring-loaded valve ball 32 becomes unseated from its valve seat 33, permitting the lubricating oil to be fed through outlet 34 and preferably through a connected tube to the tool, that is, the saw chain 9.

According to a feature of the invention, lubricating-oil pump 12 is provided with a simple device for interrupting or blocking the supply of oil to the outside and to saw chain 9, that is, the work tool. This is accomplished by arranging a blocking member 35 on the cover 19 of lubricating-oil pump 12.

Figure 2:
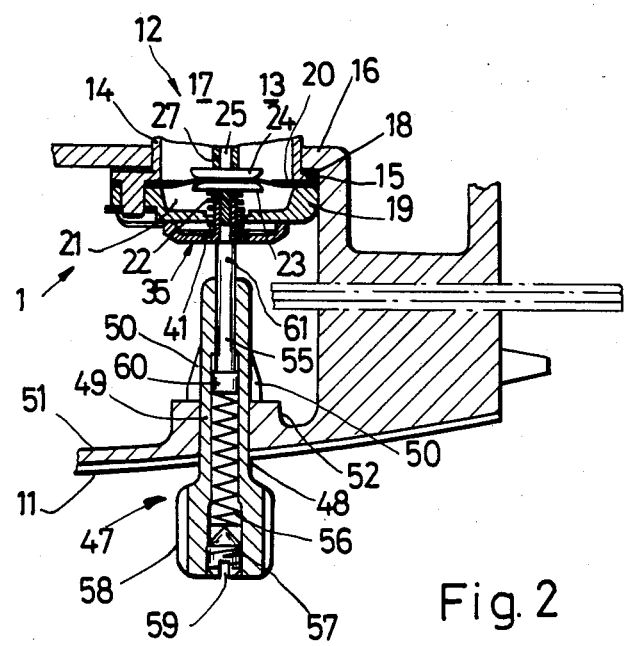
FIG. 2 is a section view taken along line II—II of FIG. 1 in the region of the lubricating-oil pump of the motor-driven chain saw and shows a major portion of the pump.
Figure 4:
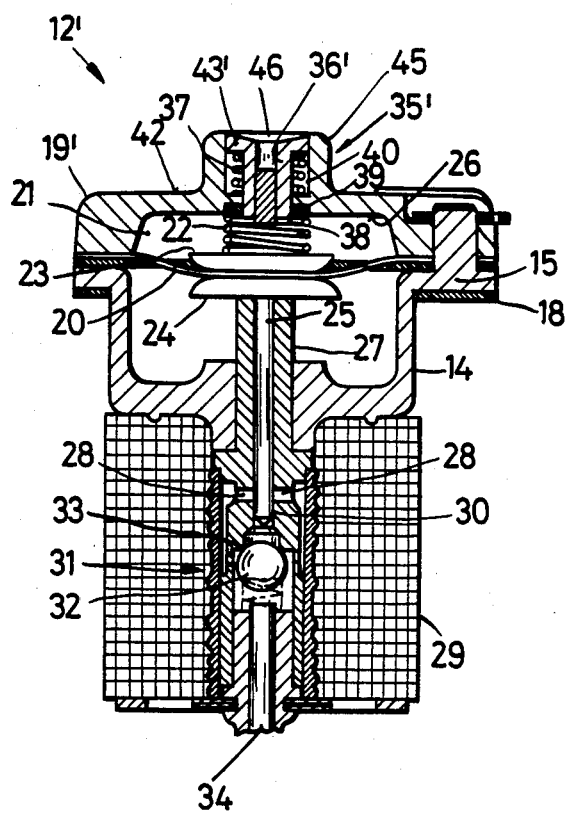
FIG. 4 is a section view of a lubricating-oil pump similar to the one of FIG. 3, yet showing a somewhat different configuration.

In the embodiments illustrated in FIGS. 2 to 4, blocking member 35 is arranged coaxially with respect to piston rod 25 and is mounted so as to be axially displaceable in the direction toward piston rod 25 to thereby limit the stroke of the latter. For this purpose, blocking member 35 includes a sleeve bushing 36 surrounded by a helical spring 37 and is displaceable in the direction toward the pump diaphragm 20 against the force of the spring 37. At the end of sleeve 36 and extending into chamber 21, blocking member 35 has a closure plug 38 and is sealed by a sealing ring 39 at the periphery of bore 40 of cover 19. The outer diameters of sleeve bushing 36 and closure plug 38 are less than the inner diameter of helical compression spring 22 in the chamber 21.

In the embodiment of FIG. 3, blocking member 35 has a rubber-like elastic cap 41 arranged on the outside 42 of cover 19 and surrounding blocking member 35. For this purpose, the upper end of sleeve bushing 36 has a collar 43 secured by embedment in the region of the wall 44 of the elastic cap 41. Spring 37 bears with one end against outside wall surface 42 of cover 19 and, with its other end, against the inner wall surface of cap 41 below collar 43. By pressing upon collar 43 of sleeve bushing 36 from the outside, blocking member 35 is displaced inwardly into chamber 21 under deformation of the elastically yielding cap 41. This limits the stroke of pump diaphragm 20 since closure plug 38 will abut against upper disc 23 in the region of the inner diameter of helical compression spring 22, thereby blocking the upward stroke movement of piston rod 25 and pump diaphragm 20. This automatically interrupts the discharge of oil to the outside when, for example, a tool other than the saw tool for which it is intended is mounted on housing 2 or when the cutting teeth of saw chain 9 are to be sharpened by means of sharpener 10.

Limiting the stroke by exerting a downward pressure (arrow 80) on blocking member 35 may be preferably accomplished by a suitable bolt 81 provided on the accessory attachment or tool 82, so that the stroke movement is already limited automatically when the accessory attachment, for example, a hedge trimmer, is mounted thereby obviating the need for further operator intervention. When the accessory attachment is disconnected again, this blocking of the stroke movement will be automatically removed because spring 37 will then urge the rubber-like cap 41 outwardly thereby unseating plug 38 from upper disc 23 and clearing the stroke path for pump diaphragm 20 and piston rod 25.

Figure 2A:
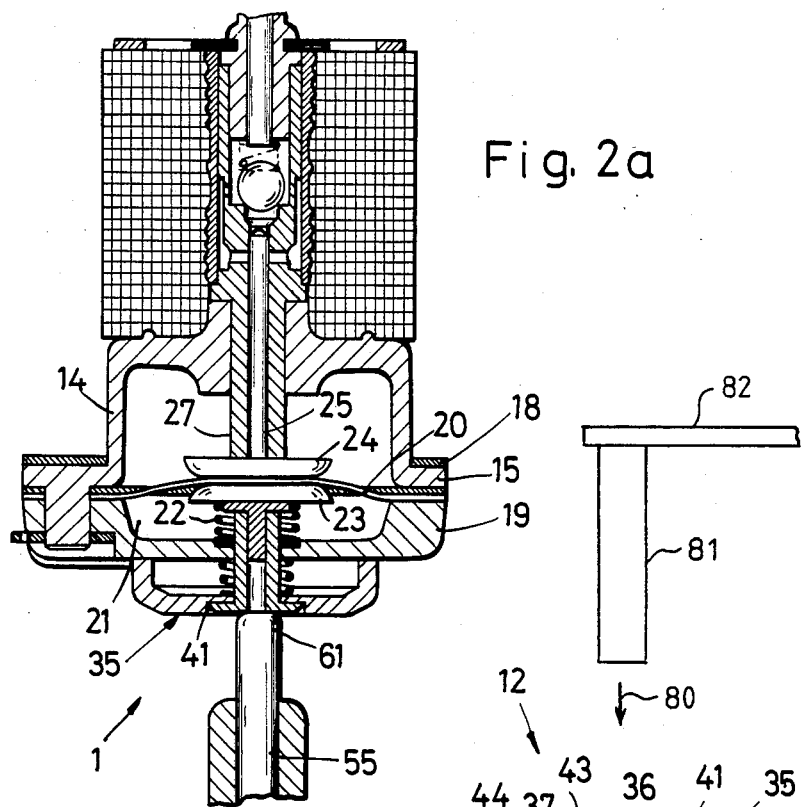
FIG. 2a shows a portion of FIG. 2 drawn to a larger scale and includes the oil suction filter of the pump.

In the embodiment shown in FIG. 4, the configuration of the device for interrupting the supply of oil on lubricating-oil pump 12' is somewhat different from that of the embodiment of the lubricating-oil pump 12 described with reference to FIGS. 2, 2a and 3. At the top of cover 19' of housing 14, the lubricating-oil pump 12' of FIG. 4 includes a stub 45 formed on cover 19' and made of the same material as the latter. Blocking member 35' with spring 37 surrounding sleeve bushing 36' is axially slideably guided in stub 45. Thus, a rubber cap is not provided. Spring 37 bears against collar 43' of sleeve bushing 36' which is held captive in stub 45 by means of closure plug 38. Above, on collar 43', sleeve bushing 36' has a dish-shaped recess 46 formed therein to receive a preferably rounded end portion of a pressure bolt.

Figure 5:
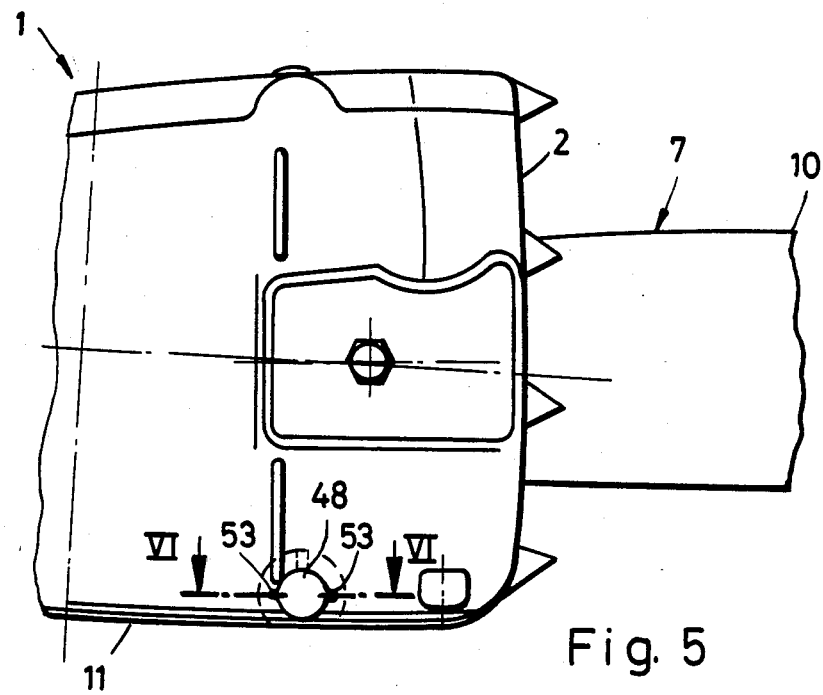
FIG. 5 is a partial side view of a motor-driven chain saw similar to the one shown in FIG. 1.

The device for interrupting the supply of oil to the work tool may preferably include a cutoff bolt 47 which either performs the oil supply interrupt function itself directly (FIG. 6) or is associated with blocking member 35, 35' of lubricating-oil pump 12, 12' and acts upon sleeve bushing 36, 36'. FIG. 2 shows how cutoff bolt 47 acts on sleeve bushing 36. The use of such a cutoff bolt 47 can be advantageous particularly if the attachment is the sharpener 10 for sharpening the cutting teeth of saw chain 9. In this embodiment, cutoff bolt 47 is suitably detachably secured in a through hole 48 of the sprocket cover 11 and includes a pipe-like body 49 which, on its outer periphery and approximately in its longitudinal center region, has two diametrically opposed engaging lugs 50 overlapping inner wall surface 51 of sprocket cover 11 at a projection 52. To permit the insertion of pipe-like body 49 into sprocket cover 11, through hole 48 includes two diametrically opposed edge recesses 53 which are adapted to permit free passage of engaging lugs 50 (FIG. 5). Pipe-like body 49 has an axial bore 54 in which a pressure pin 55 is axially displaceable. The pressure pin 55 is biased by the force of a pressure spring 56 seated in the axial bore 54. The force of pressure spring 56 is adjustable by means of an adjusting screw 57 threadably engaging a thread in the area of a handle 58 having a diameter greater than the diameter of the remainder of pipe-like body 49. Adjusting screw 57 has a cross slot 59 for engagement by a screwdriver. With its end remote from adjusting screw 57, pressure spring 56 bears against an abutment head 60 of pressure pin 55. The abutment head 60 secures the pin 55 from being pushed out of pipe-like body 49.

In the embodiment shown in FIG. 2, the free end portion 61 of pressure pin 55 extending out of pipe-like body 49 bears against sleeve bushing 36 of lubricating-oil pump 12. Sleeve bushing 36 is thereby pushed into chamber 21 by such an amount that it abuts against upper disc 23 and limits the suction stroke of piston rod 25. Correspondingly, rubber-like cap 41 is pushed inwardly against cover 19. Following the insertion of cutoff bolt 47 into sprocket cover 11, the cutoff bolt 47 is secured in its inserted position by rotating the pipe-like body 49 through 90° with engaging lugs 50 engaging into corresponding recesses 62 (FIG. 6) of projection 52. In this arrangement, cutoff bolt 47 is latched in this position by the force of pressure spring 56. In addition, pressure spring 56 provides for a tolerance compensation for the cutoff function, and adjusting screw 57 permits an accurate adjustment and, if necessary, later readjustment of the pressure force. By rotating pipe-like body 49 through 90° and pulling it out of through bore 48, cutoff bolt 47 can be withdrawn from sprocket cover 11 to remove the check on stroke movement and release the supply of oil to the work tool.

Figure 6:
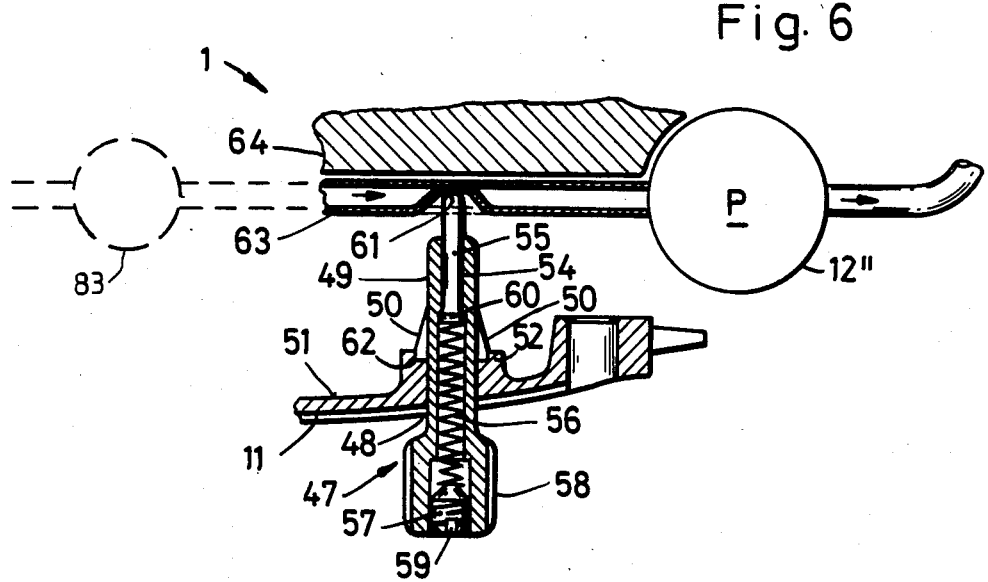
FIG. 6 is a partial section view along line VI—VI of the motor-driven chain saw of FIG. 5.

Referring to FIG. 6, cutoff bolt 47 is journalled on sprocket cover 11 and directly effects a cutoff of the supply of oil to the tool. This is accomplished by having pressure pin 55 act directly on a flexible feed tube 63 and squeezing it such that the oil supply through feed tube 63 to the work tool is interrupted. In this embodiment, feed tube 63 is configured as a suction tube of a conventionally driven lubricating-oil pump 12″. Cutoff bolt 47 could just as well act directly upon a feed tube on the delivery side of lubricating-oil pump 12″. In this way, a particularly simple and low-cost device for interrupting the supply of oil is provided. The portion 64 of the housing opposite pressure pin 55 acts as an abutting surface during the time the feed tube 63 is squeezed.

FIGS. 7 and 8 illustrate another embodiment of the invention for interrupting the supply of oil to the work tool. This embodiment is likewise particularly simple and especially suitable for use with such attachments as hedge trimmers, drills, and the like. In this embodiment, a bypass solution is chosen for the lubricating oil. A guide bar mounting pad 65 includes an oil groove 66 formed therein for saw chain 9. Orifice 67 which discharges the lubricating oil delivered by lubricating-oil pump 12, 12′, 12″ opens into oil groove 66. In addition, the outer surface of guide bar mounting pad 65 has a vent 68 for ventilating oil tank 13 which is necessary for transporting the lubricating oil. In order to interrupt the oil supply to the work tool, a cover plate 69 is placed on guide bar mounting pad 65. It may be preferably made of an elastic material so that the cover plate 69 itself acts as a sealing plate. A bypass channel 70 connects discharge orifice 67 with vent 68 and is provided in the side of cover plate 69 close to guide bar mounting pad 65. Cover plate 69 is firmly clamped between work tool 71 and guide bar mounting pad 65 by threaded fastening means for holding the work tool thereby providing a trouble-free seal. Bypass channel 70 in cover plate 69 thus provides a short circuit causing the lubricating oil which otherwise flows out of discharge orifice 67 for lubrication of saw chain 9 to be returned directly via bypass channel 70 of cover plate 69 to vent 68 which is anyway provided in a conventional motor-driven saw. Thus, the oil circuit is shorted merely by the arrangement of a simple cover plate 69 on a conventional motor-driven chain saw.

Instead of the cutoff device 47 described with reference to FIG. 6, it is also possible to use a device incorporating a two-way valve, with the valve 83 being arranged in the feed line 63 to the oil pump as shown in phantom outline.

It is understood that the foregoing description is that of the preferred embodiments of the invention and that various changes and modifications may be made thereto without departing from the spirit and scope of the invention as defined in the appended claims.

What is claimed:

1. A lubricating-oil pump arrangement for an apparatus such as a chain saw or the like to supply lubricating oil to a work tool of the apparatus, the apparatus having a motor including means for developing changes in pressure, the arrangement comprising:

a tank for holding the supply of lubricating oil;

pump means for pumping the lubricating oil from the tank to the work tool;

said pump means including: a cylinder communicating with said tank; a piston mounted in said cylinder for reciprocatory movement through a predetermined stroke distance; and, actuating means for actuating said piston for said movement through said stroke distance for pumping said lubricating oil; and, interrupt means for interrupting the flow of lubricating oil to the work tool, said interrupt means including limit means for restricting the movement of said piston through said stroke thereby interrupting the flow of said lubricating oil; said pump means further including a housing for accommodating said cylinder and said actuating means, said housing having a cover arranged transversely with respect to the longitudinal axis of said cylinder; and, said limit means being mounted on said cover so as to be displaceable along said axis to limit the stroke of said piston;

said actuating means including a pump membrane connected to said piston, said pump membrane being arranged in said housing so as to define a chamber therein conjointly with said cover, said chamber communicating with said pressure changing means for developing overpressure and underpressure conditions in said chamber for actuating said membrane; said cover having a bore formed therein coaxially with said piston, said limit means being a bushing extending through said bore; and, said interrupt means further comprising a spring for resiliently biasing said bushing in a direction away from said membrane; said bushing being mounted in said bore so as to be displaceable against the force of said spring in a direction toward said membrane for limiting the movement thereof.

2. The arrangement of claim 1, said interrupt means further comprising: a sealing ring disposed on the side of said cover inside said chamber at the region of the periphery of said bore, said bushing including a closure plug formed thereon on the portion thereof disposed in said chamber for coacting with said seal for sealing said chamber with respect to the ambient under the force of said spring.

3. The arrangement of claim 2, said actuating means further comprising an upper disc and a lower disc disposed so as to sandwich said membrane therebetween, said discs being connected to said piston; and, a helical compression spring disposed in surrounding relationship to said piston and between said cover and said upper disc, said compression spring having an inner diameter greater than the outer diameter of said closure plug so as to permit said bushing to move within said compression spring and come into contact engagement with said upper disc when said bushing is displaced toward said membrane.

4. The arrangement of claim 3, said pump means further comprising a filter disposed in surrounding relationship to a portion of said cylinder; suction bore means formed in said portion of said cylinder and communicating with said tank through said filter; outlet valve means disposed in said cylinder at a location in said cylinder corresponding to the end region of said stroke of said piston so as to be responsive to the movement of said piston and release lubricating oil to the work tool.

5. The arrangement of claim 4, said interrupt means further comprising a rubber-like elastic cap mounted on said housing above said cover on a side thereof facing away from said chamber; said bushing having an end facing away from said closure plug, said end being firmly held in said cap.

6. The arrangement of claim 5 said end of said bushing defining a collar mounted in the wall of said cap.

7. A lubricating-oil pump arrangement for a motor-driven apparatus such as a chain saw or the like to supply lubricating oil to a work tool of the apparatus, the arrangement comprising:
a tank for holding the supply of lubricating oil;
pump means for pumping the lubricating oil from the tank to the work tool; said pump means including;
a cylinder communicating with said tank; a piston mounted in said cylinder for reciprocatory movement through a predetermined stroke distance; and, actuating means for actuating said piston for said movement through said stroke distance for pumping said lubricating oil; and,
interrupt means for interrupting the flow of lubricating oil to the work tool, said interrupt means including limit means for restricting the movement of said piston through said stroke thereby interrupting the flow of said lubricating oil; and,
said pump means further including a housing for accomodating said cylinder and said actuating means, said housing having a cover arranged transversely to the longitudinal axis of said cylinder, said cover having a stub formed thereon defining a bore coaxial with said axis; and, said limit means being a bushing displaceably mounted in said bore; said interrupt means further comprising a spring disposed in said bore for resiliently biasing said bushing in a direction away from said membrane; said bushing being mounted in said bore so as to be displaceable against the force of said spring in a direction toward said membrane thereby limiting the movement thereof.

8. A lubricating-oil pump arrangement for a motor-driven chain saw to supply lubricating oil to the cutting chain thereof, the chain saw having a housing and a sprocket cover attached to the housing, the arrangement comprising:
a tank for holding the supply of lubricating oil;
pump means for pumping the lubricating oil from the tank to the cutting chain, and, interrupt means for interrupting the flow of lubricating oil to the cutting chain, said interrupt means including a cutoff bolt for acting on said pump means to cut off the supply of oil to the work tool; and, through bore means formed in said cover for accommodating said cutoff bolt therein; and, releasable latch means for releasably latching said cutoff bolt in said cover;
said cutoff bolt being a cutoff bolt assembly comprising a pipe-like body disposed in said bore means; said cutoff bolt assembly further including a pressure pin displaceably mounted in said pipe-like member so as to project therefrom for coacting with said pump means; and, a spring disposed in said pipe-like member for applying a resilient load to said pin; and, said latch means comprising at least one engaging lug formed on said pipe-like member for engaging the inner wall surface of said cover.

9. The arrangement of claim 8, said latch means comprising two of said engaging lugs formed on said pipe-like body so as to be on diametrically opposite sides thereof for engaging the inner wall surface of said cover; and, two mutually adjacent slots formed in said cover on diametrically opposite sides of said bore means for accommodating corresponding ones of said lugs when said pipe-like body is inserted and withdrawn from said cover.

10. The arrangement of claim 9, said pressure pin having an abutment head formed thereon for retaining the same in said pipe-like body; said cutoff bolt assembly further comprising an adjustment screw threadably engaging said pipe-like body at an end thereof facing away from said abutment head so as to cause said spring to be disposed between said abutment head and said adjustment screw whereby the latter can be positioned in said pipe-like body to adjust the resilient force applied by said spring to said pressure pin.

11. The arrangement of claim 10, said pump means comprising: a cylinder communicating with said tank; a piston mounted in said cylinder for reciprocatory movement through a predetermined stroke distance; actuating means for actuating said piston for said movement through said stroke distance for pumping said lubricating oil; and, a housing for accommodating said cylinder and said actuating means, said housing having a cover arranged transversely with respect to the longitudinal axis of said cylinder; and, said interrupt means including limit means for restricting the movement of said piston through said stroke thereby interrupting the flow of said lubricating oil; said limit means being mounted on said cover so as to be displaceable along said axis to a limit position whereat the stroke of said piston is blocked; said pressure pin being in contact engagement with said limit means for holding the latter in said limit position.

12. A lubricating-oil pump arrangement for a motor-driven chain saw for supplying lubricating oil to the cutting chain thereof, the chain saw having a housing and a sprocket cover attached to the housing, the arrangement comprising:
a tank for holding the supply of lubricating oil;
· pump means for pumping the lubricating oil from the tank to the cutting chain;
said pump means including; a pump; a first conduit interconnecting said tank and said pump; and, a second conduit for conducting lubricating oil from said pump to the cutting chain; at least one of said conduits being configured so as to be resiliently squeezable and, a cutoff assembly mounted in said sprocket cover for interrupting the flow of lubricating oil to the cutting chain, said cutoff assembly including an interrupt member mounted so as to be moveable between a first position whereat said interrupt member is clear of said one conduit and a second position whereat said interrupt member acts on said one conduit so as to squeeze the latter thereby interrupting the flow of lubricating oil to the cutting chain.

13. A lubricating-oil pump arrangement for a motor-driven chain saw to supply lubricating oil to the cutting chain thereof, the chain saw being adapted to accommodate an accessory work tool such as a hedge trimmer, drilling tool or the like, the chain saw having a housing defining a mounting pad for a guide bar, the arrangement comprising:

a tank for holding the supply of lubricating oil;

pump means for pumping the lubricating oil from the tank to the work tool; and, interrupt means for interrupting the flow of lubricating oil to the work tool;

said pump means including a pump connected to said tank and conduit means for conducting the lubricating oil to the location of the work tool, said conduit means including: opening means formed in said mounting pad and vent means likewise formed in said mounting pad and communicating with said tank; and, said interrupt means including: a cover plate removably mounted on the surface of said mounting pad; and, channel means formed in said cover plate for guiding the lubricating oil from said opening means to said vent means thereby directing said lubricating oil back to said tank.

14. The arrangement of claim 13, said cover plate being a plate made of elastic material and mounted against said surface so as to be self-sealing with respect thereto.

15. The arrangement of claim 14, wherein a work tool is mounted on said mounting pad so as to sandwich said plate therebetween.

16. A lubricating-oil pump arrangement for a chain saw having a motor housing adapted to accommodate an accessory work tool such as a hedge trimmer, drilling tool or the like which requires no lubricating oil during the operation thereof, the arrangement comprising:

a tank for holding the supply of lubricating oil;

pump means for pumping the lubricating oil from the tank to the work tool, said pump means including: a pump housing mounted on said motor housing; a cylinder mounted in said pump housing and communicating with said tank; a piston mounted in said cylinder for reciprocatory movement through a predetermined stroke distance; and, actuating means for actuating said piston for said movement through said stroke distance for pumping said lubricating oil; and, interrupt means for interrupting the flow of lubricating oil to the work tool, said interrupt means including an interrupt member movably mounted on said pump housing for movement between a first position whereat said interrupt member is clear of said piston and a second position whereat said interrupt member engages and blocks the movement of said piston to interrupt the flow of oil to said accessory work tool;

said accessory work tool including contact means for engaging said interrupt member; and, said interrupt member being disposed on said pump housing so as to receive said contact means of said accessory work tool in contact engagement therewith so as to be displaceable thereby to said second position by the accessory work tool as the latter is mounted to the motor housing of the chain saw.

17. The arrangement of claim 16, said pump housing having a cover arranged transversely with respect to the longitudinal axis of said cylinder; and, said interrupt member being mounted on said cover so as to be displaceable along said axis to limit the stroke of said piston.

* * * * *